United States Patent
Christensen (10) Patent No.: US 11,506,186 B2
(45) Date of Patent: Nov. 22, 2022

(54) YAW CLAW SET FOR WIND TURBINE YAW BEARINGS

(71) Applicant: Vestas Wind Systems A/S, Aarhus N. (DK)

(72) Inventor: Flemming Christensen, Hinnerup (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/260,298

(22) PCT Filed: Sep. 2, 2019

(86) PCT No.: PCT/DK2019/050257
§ 371 (c)(1),
(2) Date: Jan. 14, 2021

(87) PCT Pub. No.: WO2020/057701
PCT Pub. Date: Mar. 26, 2020

(65) Prior Publication Data
US 2021/0285426 A1    Sep. 16, 2021

(30) Foreign Application Priority Data

Sep. 17, 2018  (DK) .......................... PA 2018 70603

(51) Int. Cl.
*F03D 80/70*        (2016.01)
*F03D 7/02*         (2006.01)
(52) U.S. Cl.
CPC ........... *F03D 80/70* (2016.05); *F03D 7/0204* (2013.01)
(58) Field of Classification Search
CPC ............................... F03D 80/70; F03D 7/0204
See application file for complete search history.

(56) References Cited

U.S. PATENT DOCUMENTS

| 2011/0233939 A1 | 9/2011 | Noda et al. |
| 2012/0224799 A1 | 9/2012 | Wagner |
| 2015/0308414 A1 | 10/2015 | Roer et al. |

FOREIGN PATENT DOCUMENTS

| DE | 102007056763 A1 | 12/2008 |
| DE | 202011102602 U1 | 10/2011 |

(Continued)

OTHER PUBLICATIONS

European Patent Office, International Search Report and Written Opinion in PCT Application No. PCT/DK2019/050257, dated Nov. 12, 2019.

(Continued)

*Primary Examiner* — Viet P Nguyen
(74) *Attorney, Agent, or Firm* — Wood Herron & Evans LLP (57) ABSTRACT

A set (200) of yaw claws (150) is provided comprising at least a first yaw (150*a*) claw and a second yaw claw (150*b*). The first yaw claw (150*a*) is to be used in a bearing ring (140) of a first yaw bearing (130) and the second yaw claw (150*b*) in a bearing ring (130) of a second yaw bearing (140). A circumference of the bearing ring (140) of the first yaw bearing (130) is substantially different from a circumference of the bearing ring (140) of the second yaw bearing (130). Each yaw claw (150) has a periphery, formed by a first side end (176), a second side end (178), an inner arc (172) and an outer arc (174), the inner arc (172) and the outer arc (174) being concentric with the respective bearing ring (140). At least two spring packs (166) are provided for pre-tensioning the yaw claw (150), respective spring pack centres (167) of the at least two spring packs (166) being arranged on a spring pack centreline (169) that is concentric with the inner arc (172) and the outer arc (174). A length of the spring pack centreline (169), measured from the first side end (176) to the second side end (178), of the first yaw claw (150*a*) is (Continued)

substantially equal to a length of the spring pack centreline (169) of the second yaw claw (150*b*).

13 Claims, 9 Drawing Sheets

(56) References Cited

FOREIGN PATENT DOCUMENTS

| EP | 1571334 A1 | 9/2005 |
| EP | 2706254 A1 | 3/2014 |
| WO | 2017162250 A1 | 9/2017 |
| WO | 2017215724 A1 | 12/2017 |

OTHER PUBLICATIONS

Danish Patent and Trademark Office, Search and Examination Report in PA 2018 70603, dated Apr. 3, 2019.
European Patent Office, Examination Report in EP Application No. 19765173.0, dated Apr. 21, 2022.
Intellectual Property of India, Examination Report in IN Application No. 202117017576, dated Aug. 3, 2022.

YAW CLAW SET FOR WIND TURBINE YAW BEARINGS

FIELD OF THE INVENTION

This invention relates to a set of yaw claws, and a method of manufacturing a yaw claw for a bearing ring of a yaw bearing.

BACKGROUND ART

So as to orient a rotor of a wind turbine towards the wind, the wind turbine is provided with a yaw system. The yaw system provides a rotatable connection between the nacelle, carrying the rotor hub with the rotor blades, and the wind turbine tower. By rotating the nacelle relative to the wind turbine tower, the rotor blades can be rotated into or out of the wind direction. The yaw bearing is a crucial and cost intensive component of a yaw system. It must withstand enormous static and dynamic loads and moments during wind turbine operation and provide smooth rotation characteristics for the orientation of the nacelle under all weather conditions.

Generally, a yaw bearing comprises an outer bearing ring that is fixedly attached to the wind turbine tower and an inner bearing ring that is fixedly attached to the nacelle. In alternative configurations the nacelle may be attached to the outer bearing ring and the tower to the inner bearing ring. Bearing balls, rollers or pads are provided between the two rings to facilitate the rotation of the nacelle with respect to the wind turbine tower. One type of yaw bearing comprises an outer yaw rim, fixedly attached to a tower of a wind turbine and an inner bearing ring comprised of a plurality of interconnected yaw claws, each of which being fixedly attached to a nacelle of the wind turbine. Between the outer yaw rim and each yaw claw is provided at least one bearing pad or roller, thus allowing the inner yaw rim and the nacelle to rotate relative to the outer yaw rim and the wind turbine tower.

A known method for manufacturing such yaw claws involves first moulding an inner yaw rim for a yaw bearing with a specified diameter that is suitable for a tower and a nacelle of the wind turbine of a particular size, followed by then breaking up the inner yaw rim into the required yaw claws. For wind turbine towers and yaw bearings of different sizes, different bearing ring moulds are provided. Production, storage and maintenance of a range of differently sized bearing ring moulds can lead to high costs.

The number of yaw claws that the inner yaw rim inner yaw rim should be divided up into, and hence the length of the outer arc of each yaw claws, is usually decided on considering the structural strength and handling of each individual yaw claw. As a result of such considerations, the designs of such yaw claws vary with respect to size, shapes, bolts and pins patterns, spring packs and bearing pads or rollers. Yaw claws for differently sized bearing rings may use different parts and require different packaging.

It is against this background that the invention has been devised.

SUMMARY OF THE INVENTION

According to an aspect of the invention, there is provided a set of yaw claws comprising at least a first yaw claw and a second yaw claw. The first yaw claw is to be used in a bearing ring of a first yaw bearing and the second yaw claw in a bearing ring of a second yaw bearing. A circumference of the bearing ring of the first yaw bearing is substantially different from a circumference of the bearing ring of the second yaw bearing. Each yaw claw has a periphery, formed by a first side end, a second side end, an inner arc and an outer arc. The inner arc and the outer arc are concentric with the respective bearing ring. At least two spring packs for pre-tensioning the yaw claw are provided. Respective spring pack centres of the at least two spring packs are arranged on a spring pack centreline that is concentric with the inner arc and the outer arc. A length of the spring pack centreline, measured from the first side end to the second side end, of the first yaw claw is substantially equal to a length of the spring pack centreline of the second yaw claw.

By providing the different yaw claws in the set with substantially similar dimensions, it is made possible to use the same parts for the yaw claws and their connections to the nacelle or wind turbine tower. Further, they can use the same standard packaging and may be manufactured using the same mould and tools. All such advantages lead to more efficient manufacturing and logistics, easier inventory management and reduced costs.

The dimensions of a yaw claw can be characterized by the length of the inner and outer arcs and a radial width, which is herein defined as the shortest distance between the two arcs. Preferably, the first and second side ends of the yaw claw are perpendicular to the inner and outer arcs and will therefore both have a length equaling the radial width.

Another characteristic dimension of the yaw claw is the length of the spring pack centreline as measured from the first to the second side ends.

According to the invention, the length of the spring pack centreline is kept substantially equal for all yaw claws in the set. As a consequence, the inner arcs and the outer arcs of all yaw claws in the set will also be similarly sized. However, the variation in length for the inner and outer arcs will be slightly larger than for the spring pack centrelines. 'Substantially equal' herein means that the minimum and maximum spring pack centreline length of all yaw claws in the set will not differ more than about 0.5%, preferably not more than about 0.2% or even 0.1%. The resulting variation in length of the inner and outer arcs will be larger, but may still be kept within 5% for the inner arc length and 20% for the outer arc length, even when the yaw claws in the set can be used for bearing rings that range from 2 to 8 meters in diameter. When allowing some variation in radial width, the inner arc lengths and/or the outer arc lengths of all yaw claws can be kept even more equal.

Because all yaw claws in the set have very similarly dimensions, it is possible to benefit from the above mentioned advantages of the invention such as standard packaging and the use of the same tools and parts. Preferably also the radial width of each yaw claw is substantially equal in the first and second yaw claw. Substantially equal radial widths, enables the use of the same parts, such as spring packs, bearing pads, fastening bolts or connection pins.

Preferably, also a depth profile of the two side ends is substantially the same for the first and the second yaw claw.

Each yaw claw may comprise at least one attachment feature for directly or indirectly fixing the yaw claw to a tower or a nacelle of a wind turbine. The first yaw claw and the second yaw claw may then use the same type and size and have the same amount of said attachment features. The same may be achieved for other parts, like spring packs, bearing pads (or balls or rollers). Also the position of all these parts and features in and on the yaw claws is preferably substantially the same through the whole set of yaw claws. Positions and relative distances can e.g. be measured from the outer periphery of the yaw claws, but also relative to the centre of the bearing ring for which the yaw claw is used. Positions and distances may thus be expressed in e.g. mm and/or angular degrees.

In an exemplary set of yaw claws, the first and second yaw claws have an outer arc length of between about 450 mm and 650 mm, preferably about 500 mm. A ratio of the length of the outer arc of each yaw claw and the circumference of the respective bearing ring may be between 1:8 and 1:50 or between 1:10 and 1:30. The circumference of the bearing ring and the amount of yaw claws in that bearing ring together determine the length and curvature of the yaw claws. The different bearing rings built with the yaw claws from the set will have different numbers of yaw claws. Preferably, the dimensions and curvature of all yaw claws are such that, when assembled, there will only be small gaps between adjacent yaw claws and no additional, differently sized, connector claws are needed for closing the full circle of the bearing ring. In such a preferred situation, the difference in circumference of two bearing rings built from yaw claws of the same set is determined by the lengths of the outer arcs.

According to a further aspect of the invention, a method of manufacturing yaw claws for a bearing ring of a yaw bearing is provided. The yaw claw has an inner arc and an outer arc, both being concentric with the bearing ring and having a predetermined curvature. The method starts with a step of providing a base claw mould and moulding a base claw in the base claw mould. The base claw has an inner boundary and an outer boundary with contours that differ from the respective predetermined curvatures of the inner and outer arcs of the yaw claw. The method further comprises a step of machining the base claw to obtain the yaw claw with inner and outer arcs having the predetermined curvatures.

The shape of the base claw, as seen from the top, may be a superposition of the shapes of all yaw claws in a set of yaw claws. 'As seen from the top' herein means in plan view, looking from a direction parallel to the rotational axis of the bearing ring. When the bearing ring is installed in a wind turbine, that means looking down from the position of the nacelle. With such a shape, the amount of machining required for acquiring the desired shape of the respective yaw claws will be minimal. Alternatively, the base claw may have a fully rectangular shape. The mould for such a rectangular base claw may be easier to produce, but the machining step will take more time and effort and more material will be wasted. Also other shapes that at least comprise the superposition of the shapes of all yaw claws in the set are possible.

BRIEF DESCRIPTION OF DRAWINGS

The above and other aspects of the invention will now be described, by way of example only, with reference to the accompanying drawings, in which.

In the drawings, like features are denoted by like reference signs.

DETAILED DESCRIPTION OF PREFERRED EMBODIMENTS

The following detailed description refers to the accompanying drawings that show, by way of illustration, specific details and embodiments in which the invention may be practised. These embodiments are described in sufficient detail to enable those skilled in the art to practise the invention. Other embodiments may be utilised and structural, logical, and electrical changes may be made without departing from the scope of the invention as defined in the appended claims.

Figure 1:
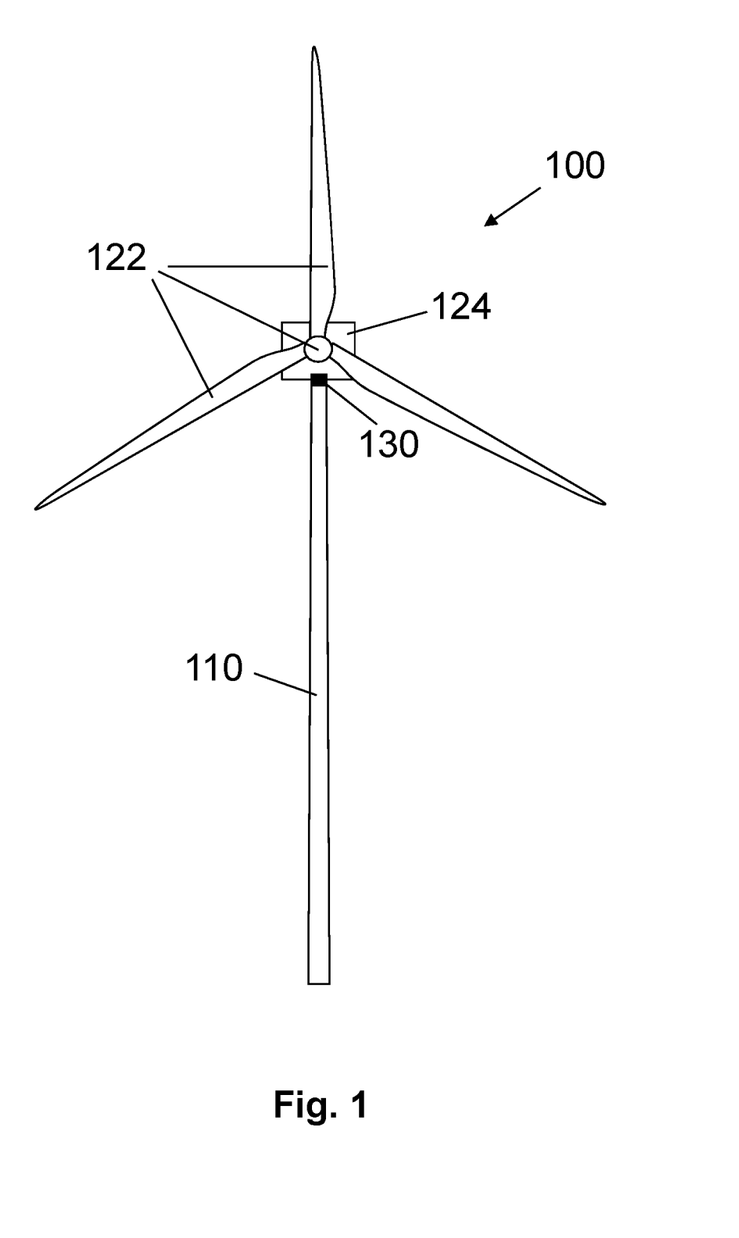
FIG. 1 shows a wind turbine in which the products of the inventions could be advantageously used.

The invention concerns a wind turbine 100, as shown in FIG. 1, comprising a tower 110, a rotor 122 and a nacelle 124 on which the rotor 122 is mounted, and a yaw bearing 130, which rotatably connects the tower 110 to the nacelle 124. The rotor 122 comprises a rotor hub to which, in this wind turbine 100, three rotor blades are attached. The yaw bearing 130 is configured such that the nacelle 124 together with the rotor 122 mounted thereon is rotatable relative to the tower 110. As such, the nacelle 124 may be arranged such that the rotor 122 is oriented towards the wind. When oriented towards the wind, the wind turbine 100 is operable to generate more electricity.

Figure 2:
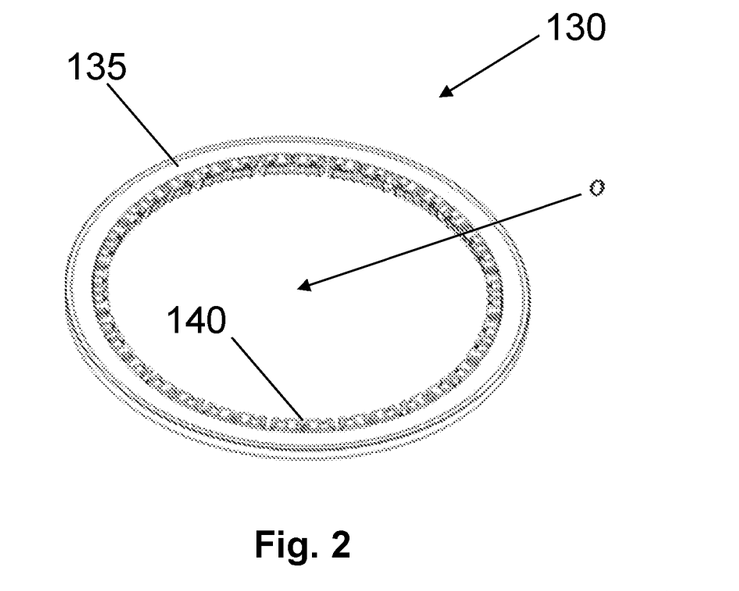
FIG. 2 shows a yaw bearing of which the inner ring is made up of yaw claws.
Figure 3:
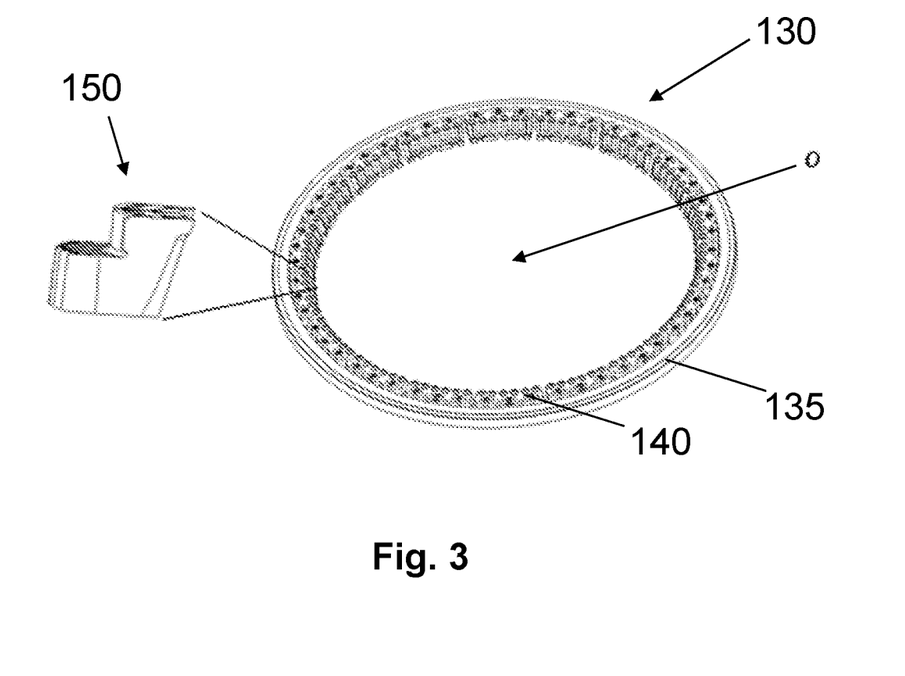
FIG. 3 shows a different embodiment of a similar yaw bearing and an enlarged view of one of its yaw claws.

As shown in FIGS. 2 and 3, the yaw bearing 130 comprises an (outer) yaw rim 135 and an (inner) bearing ring 140 being rotatably connected to the outer yaw rim 135. The yaw bearing 130 is circular and has a centre O. A circumference of the yaw bearing 130 is generally between about 7800 mm and 26000 mm.

Figure 6:
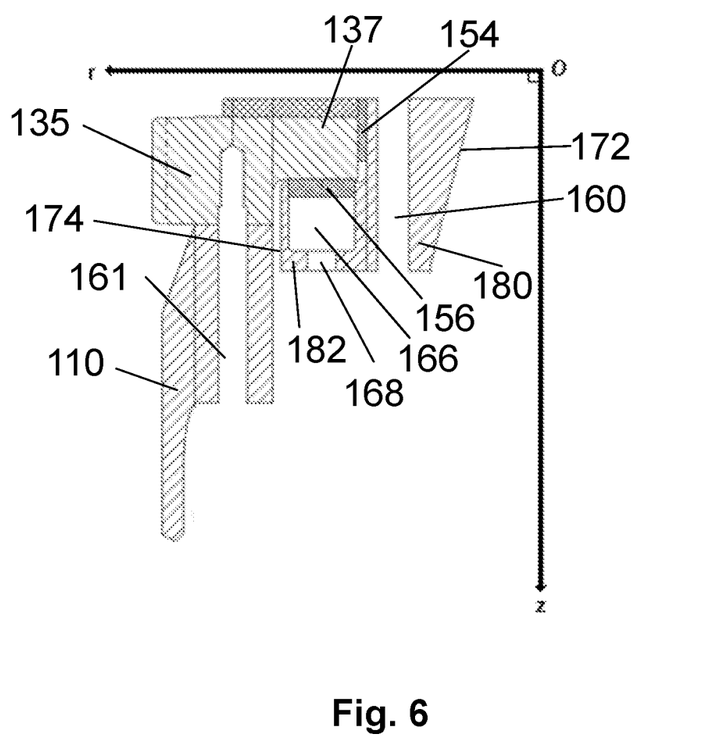
FIG. 6 shows a cross section of a yaw claw.

The yaw rim 135 and the bearing ring 140 are circular and concentric, and when installed share the same centre O. An outer circumference of the bearing ring 140 is slightly smaller than an inner circumference of the bearing yaw rim 135, so as to allow for bearing pads 154, 156 therebetween (see FIG. 6). These bearing pads allow the nacelle 124 and the bearing ring 140 to which the nacelle 124 is fixed to rotate relative to the yaw rim 135 and the tower 110 to which the yaw rim 135 is fixed. The yaw rim 135 is fixedly attached to the tower 110 of the wind turbine 100 by attachment features such as bolts (not shown). A bolt cavity 161 in the yaw rim 135 for receiving such a bolt is shown in FIG. 6. The yaw rim 135 is integrally formed from, e.g., alloy steel and is constructed to match the size of the bearing ring 140.

Figure 4:
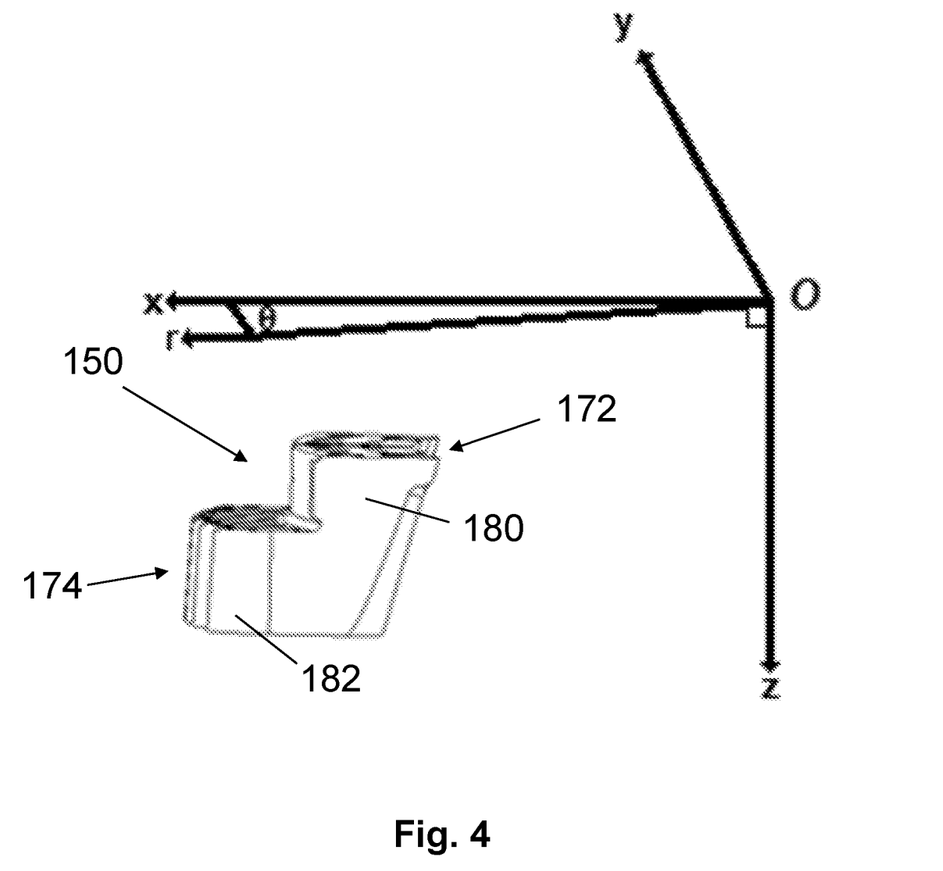
FIG. 4 shows the yaw claw of FIG. 3 in a geometric reference frame.
Figure 5A:
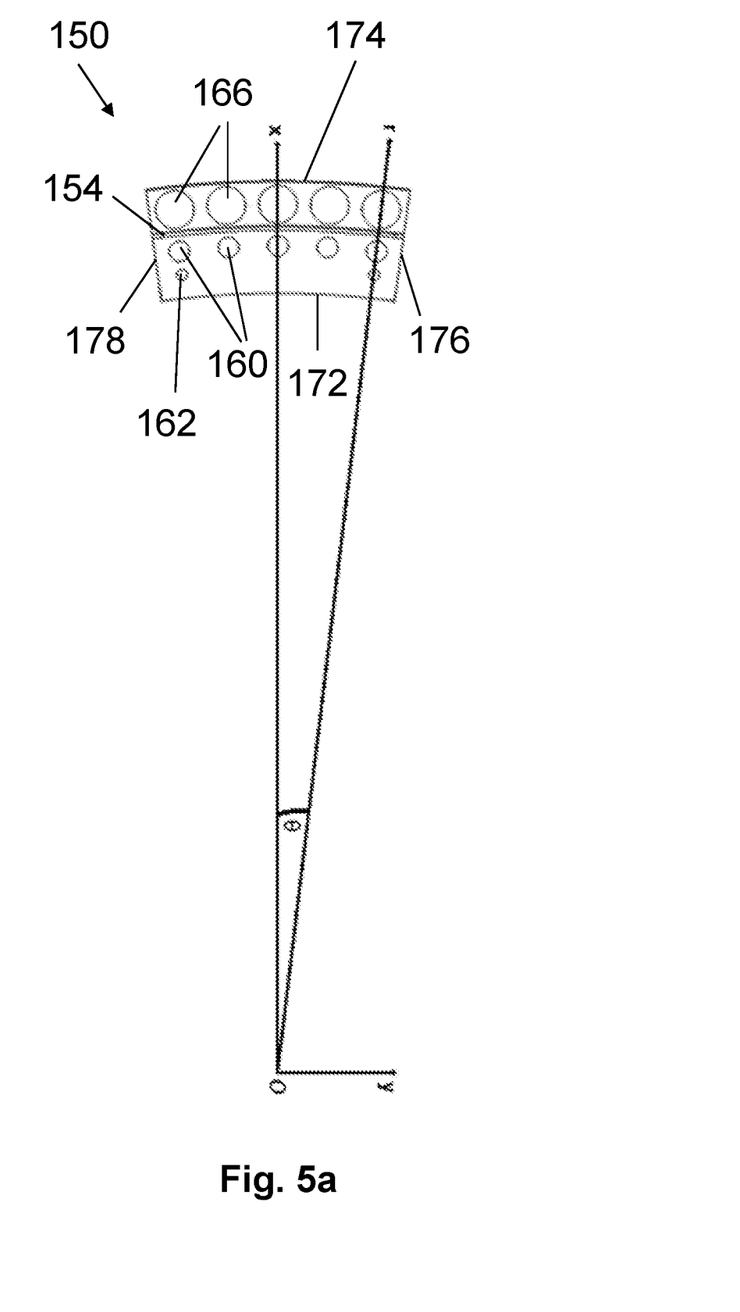
FIGS. 5*a* and 5*b* show top views of yaw claws from a set of yaw claws.
Figure 5B:
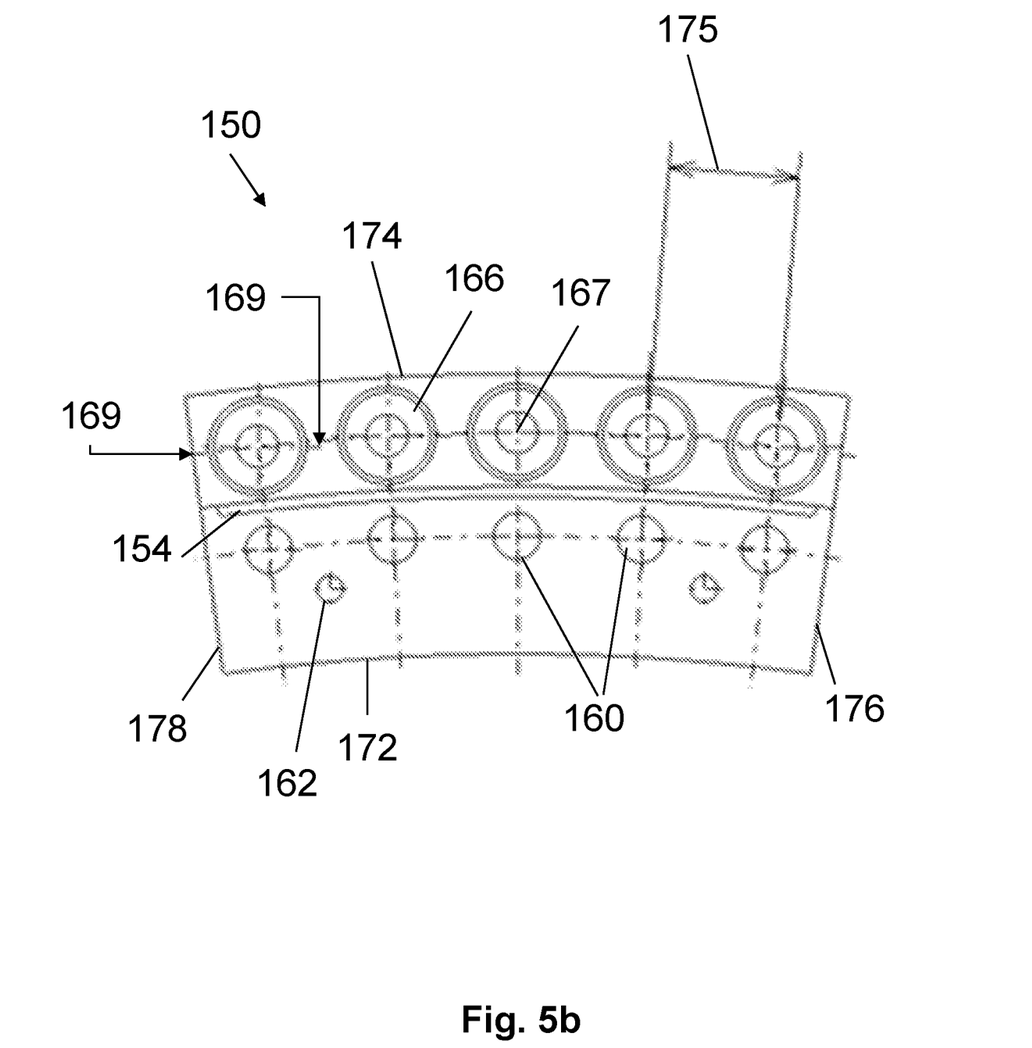

The bearing ring 140 is formed of a plurality of substantially identical and interconnected L-shaped yaw claws 150, as shown in FIG. 3. It is noted that other shapes, such as e.g. C-shapes may be used. There are between 10 and 30 yaw claws 150 in the bearing ring 140. Each yaw claw 150 is fixedly attached to the nacelle 124 of the wind turbine 100 by a plurality of attachment features such as bolts and pins (not shown). Bolt and pin cavities 160, 162 for receiving such bolts and pins are shown in FIGS. 4 and 5. The yaw claws 150 are preferably made out of cast iron or structural steel, but other materials can be used and the invention is certainly not limited to yaw claws 150 of a specific material.

A yaw claw 150 of the bearing ring 140 is now described in more detail with reference to FIGS. 4, 5 and 6. As best shown in FIG. 4, the yaw claw 150 can be described with reference to both a cylindrical co-ordinates system (r, θ, z) and a three-dimensional Cartesian co-ordinates system (x=r·cos(θ), y=r·sin(θ), z) comprising mutually orthogonal x-, y- and z-axes. Both co-ordinates systems have origin O that coincides with the centre of the yaw bearing 130. The z-axis, or rotational axis, is common to both co-ordinates system and extends away from the origin O. The radial axis, or r-axis, of the cylindrical co-ordinates system extends away from the z-axis in all directions, i.e. the radial axis, or r-axis, is orthogonal to the z-axis. The angle θ is the angle between the radial axis of the cylindrical co-ordinates system and the x-axis of the Cartesian co-ordinates system.

As best shown in FIG. 5a, the yaw claw 150 has a periphery that comprises an inner arc 172 and an outer arc 174, both being concentric with the bearing and bearing ring the yaw claw 150 is intended to be used for. The periphery also includes sides 176, 178 which extend between the inner and outer arcs 172, 174. In use, the outer arc 174 forms a portion of the outer circumference of a complete bearing ring 140 and the inner arc 172 forms a portion of the inner circumference of the bearing ring 140. The outer arc 174 and inner arc 172 are both concentric with the bearing 130 for which the yaw claw 150 is designed.

A ratio of the length of the outer arc 174 of each yaw claw 150 and the outer circumference of its respective bearing ring 140 is e.g. between 8 and 50 or between 10 and 30, which means that there are between 8 and 50, respectively 10 and 30, yaw claws 150 in each bearing ring 140. Smaller bearing rings 140 comprise fewer yaw claws 150 with more curvature in the inner and outer arcs 172, 174. Larger bearing rings 130 comprise more yaw claws 150 with less curvature. The minimal difference in size between two bearings constructed out of yaw claws from a set of yaw claws according to the invention is substantially equal to the length of the outer arc 174 of its yaw claws 150. The size steps may be equal to one, two, three or more yaw claw sizes. Size steps that do not correspond to an integer number of yaw claw sizes are only possible if gaps between adjacent yaw claws 150 are allowed, or if differently sized connection pieces are provided to fill such gaps. Such embodiments are, however, not preferred.

Throughout the set, sizes steps may differ. Typically, the smallest and largest yaw claws in a set may be separated by bigger size steps than the yaw claws in the middle of the set. For example, a set of eight different yaw claws may be dimensioned such that the number of yaw claws needed for the respective bearing rings is 12, 16, 18, 20, 21, 22, 24 and 49.

The yaw claw 150 has a radial width that spans a distance along the r-axis between the inner arc 172 and the outer arc 174. The length of each side 176, 178 of the yaw claw 150 is equal to this radial width. The angle extending between the sides 176, 178 of the yaw claw is known as the claw angle. As already discussed in different words, the claw angle is preferably equal to 360 divided by an integer number. If the yaw claw set 200 is used for bearing rings 140 that consist of 15 to 25 yaw claws, the respective claw angles will range from 24° to 14.4°.

FIG. 6 shows a cross-section through the yaw claw 150, in a plane comprising the radial r-axis and the rotational z-axis. In a preferred embodiment of the invention, all yaw claws 150 in the set 200 have the same radial width. When all yaw claws 150 do have the same radial width, the cross sections, when taken at the same position along the inner and outer arcs 172, 174 of the respective yaw claws 150, will look substantially the same.

As best shown in FIGS. 4 and 6, the yaw claw 150 comprises a main body 180 and a foot 182 extending radially from the bottom of the main body 180, giving the yaw claw 150 an L-shape. Alternative designs, such as e.g. a C-shape are also possible. The yaw claw 150 comprises a plurality of spring packs 166 for pre-tensioning the yaw claw 150 against a contact surface of the outer bearing ring 135. By pre-tensioning the yaw claw 150, the yaw bearing 130 is provided with a friction moment which advantageously stabilises the yaw bearing 130 during rotation. As shown in FIG. 6, spring packs 166 are located in the foot 182 of the yaw claw 150. The yaw claw 150 further comprises a tensioning means 168, e.g. in the form of an adjustment screw. The tensioning means 168 is provided below each spring pack 166, in the foot 182 of the yaw claw 150 and may be used for adjusting the tensioning of the spring pack 166.

Preferably, all yaw claws 150 in the set use the same and the same amount of spring packs 166. The spring packs 166 are preferably evenly distributed over the whole length of the yaw claw (see top view as in FIGS. 5, 7 and 8). A linear separation 175 between two spring pack centres 167 may be between about 70 mm and 130 mm, and preferably between 90 mm and 110 mm. The distance between the outer spring packs 166 and the lateral ends of the yaw claws is preferably about half the distance between two spring packs such that all spring packs of the bearing ring 140 are evenly distributed over the whole bearing ring 140.

As best shown in FIGS. 5a and 5b, the spring packs 166 are arranged with their spring pack centres 167 on a spring pack centreline 169 that is concentric with the inner and outer arcs 172, 174 of the yaw claw 150. Similarly, the bolts and pins cavities 160, 162 of the yaw claw 150 are aligned on their respective same centrelines.

As referred to above, each yaw claw 150 comprises a plurality of bearing pads including horizontal and vertical bearing pads 156, 154. The bearing pads 154, 165 preferably extend over the whole length of each yaw claw 150. The bearing pads 154, 156 are smooth-surfaced sliding pads and are configured such the bearing ring 140 is able to smoothly rotate along an opposing surface of the yaw rim 135. The vertical bearing pad 154 is positioned between a peripheral surface of an extension 137 of the yaw rim 135 and the main body 180 of the yaw claw 150. The horizontal bearing pad 156 is positioned between the foot 182 of the yaw claw 150 and a bottom surface of the extension 137.

Figure 7:
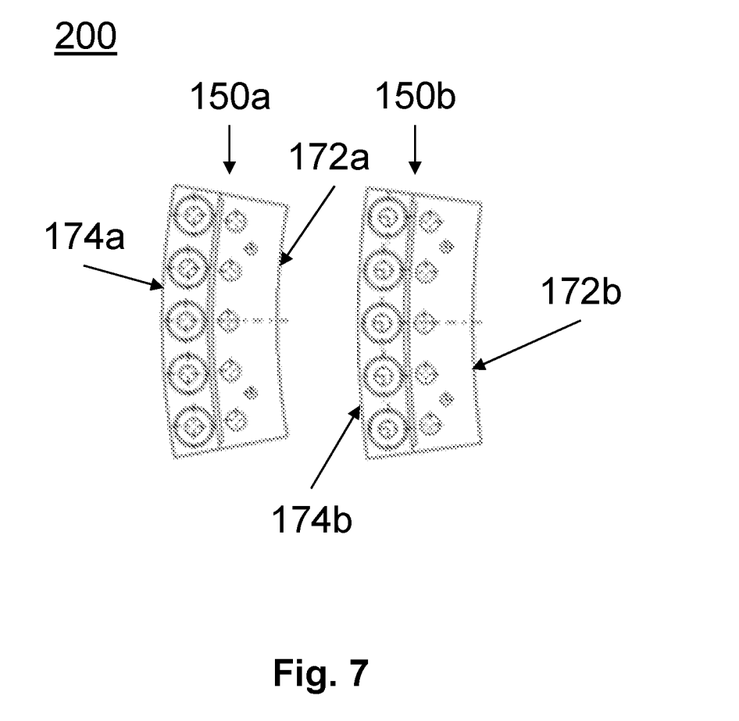
FIG. 7 shows top views of two yaw claws from the same set.
Figure 8:
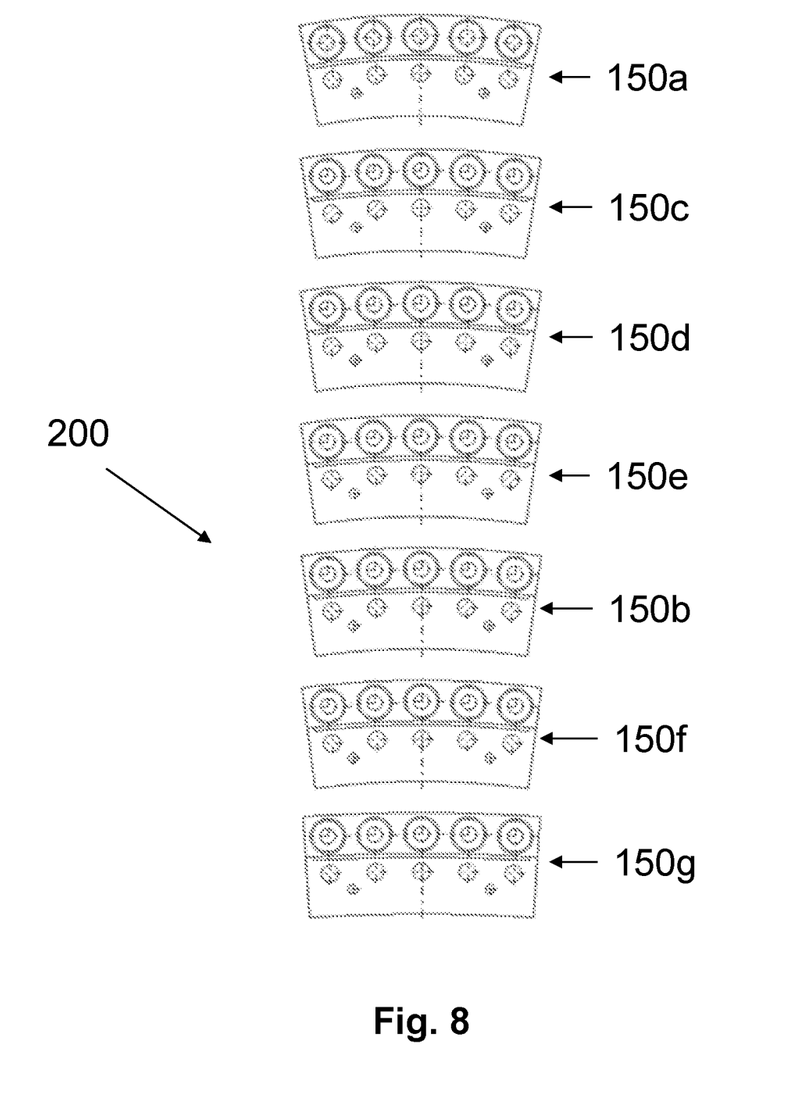
FIG. 8 shows top views of seven yaw claws from the same set.

According to the invention a set 200 of such yaw claws 150 is provided for use in bearing rings 140 with different circumferences. FIG. 7 shows a set 200 of two yaw claws 150a, 150b. In FIG. 8, this set 200 is extended to a set of seven yaw claws 150a-g to be used in bearing rings 140 of seven different sizes. The yaw claw sets 200 according to the invention provide yaw claws 150 for yaw bearings of a wide range of wind turbine tower 110 diameters. Each set 200 of yaw claws 150 comprises at least a first yaw claw 150a and a second yaw claw 150b, wherein the first yaw claw 150a is for use in a bearing ring 140 of a first yaw bearing 130 and the second yaw claw 150b is for use in a bearing ring 140 of a second yaw bearing 130. A circumference of the bearing ring 140 of the first yaw bearing 130 is substantially different from the circumference of the bearing ring 140 of the second yaw bearing 130. In the exemplary sets of FIG. 7, the second yaw bearing has a substantially larger (about 30%) circumference than the first. The first yaw claw 150a has a first inner arc 172a and a first outer arc 174a, and the second yaw claw 150b has a second inner arc 172b and a second outer arc 174b.

Although the different yaw claws 150a, 150b are used for bearings 130 of considerably different size, the length of the first outer arc 174a and a length of the second outer arc 174b are substantially equal. Also the inner arcs 172a, 172b and the radial widths of the two claws 150a, 150b are at least substantially equal. 'Substantially equal' herein means that the minimum and maximum spring pack centreline length 169 of all yaw claws 150 in the set 200 will not differ more than about 0.5%, preferably not more than about 0.2% or even 0.1%. The resulting variation in length of the inner and outer arcs 172, 174 will be larger, but may still be kept within 5% for the inner arc length and 20% for the outer arc length, even when the yaw claws 150 in the set 200 can be used for bearing rings 140 that range from 2 to 8 meters in diameter. When allowing some variation in radial width, the inner arc lengths and/or the outer arc lengths of all yaw claws can be kept even more equal.

The similar size and shape of the two yaw claws 150a, 150b, allows for the use of the same packaging, tools, spring packs, bearing pads, etc. The attachment features, spring packs 166a, 166b and bearing pads 154, 156 of the first and second yaw claws 150a, 150b of the yaw claws 150a-g in FIGS. 7 and 8 are positioned in substantially the same locations and are of the same types and dimensions. As such the yaw claws 150a-g of the sets 200 of FIGS. 7 and 8 are easy to manufacture and the parts therefor are easily replaced when needed. As a result the yaw claws 150a-g are cheap to produce, maintain and replace. The invention allows for more cost-efficient yaw bearings.

The invention also concerns a method of manufacturing a yaw claw 150 for a bearing ring 140 of a yaw bearing 130. Although the method is particularly beneficial for efficiently manufacturing a full set of yaw claws 150 according to the invention, it can also be used for producing a single type of yaw claws 150.

The method uses a single base claw mould for producing yaw claws 150 having a predetermined curvature that can be selected in dependence of the yaw bearing 130 the yaw claw 150 will be used for. The same mould can be used for producing yaw claws 150 for differently size bearing rings. The method starts with a step of providing a base claw mould and moulding a base claw 190a, 190b (see FIG. 9) in the base claw mould. The base claw 190a, 190b has an inner boundary 192a, 192b and an outer boundary 194a, 194b with contours that differ from the predetermined curvatures of the inner and outer arcs of the specific yaw claw 150 to be produced.

Figure 9:
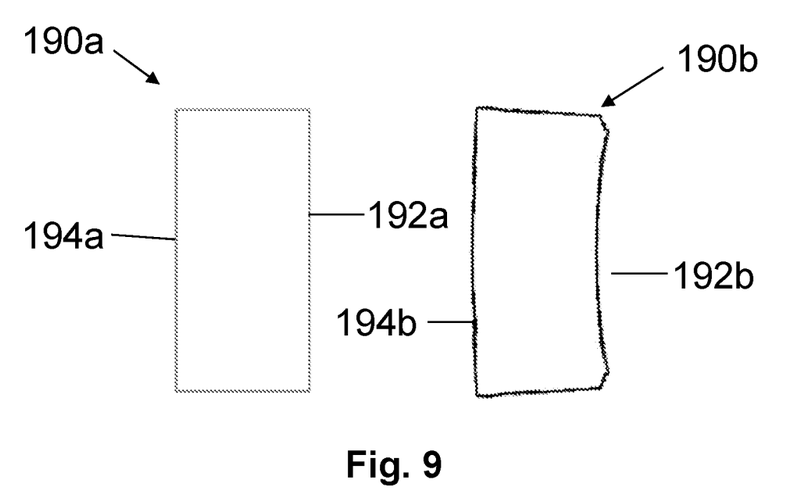
FIG. 9 shows two exemplary base claws.

The base claw 190a, 190b then undergoes a step of machining to obtain the yaw claw 150 with inner and outer arcs 172, 174 having the predetermined curvatures. Known techniques can be used for this step in which the contours of the base claw 190a, 190b are changed by removing selected bits of material. In addition to giving the yaw claw 150 its specific predetermined curvature, holes and surface features can be provided for later receiving additional yaw claw parts like, bolts, pins, spring packs and bearing pads. The pattern of such holes and surface features may be exactly the same for all yaw claws 150a-g in the set or for a sub-group of yaw claws 150 in the set. If all yaw claws 150a-g in the set use exactly the same pattern of holes and surface features, part (or all) of this pattern may already be present in the base claw 190a, 190b and provided by the base claw mould.

The shape of the base claw 190b, as seen from the top (see FIG. 9), may be a superposition of the shapes of all yaw claws 150a-g in a set 200 of yaw claws 150a-g. Wth such a shape, the amount of machining required for acquiring the desired shape of a specific yaw claw 150a-g will be minimal. Alternatively, the base claw 190a may have a fully rectangular shape. The mould for such a rectangular base claw 190a may be easier to produce, but the machining step will take more time and effort and more material will be wasted. Also other shapes that at least comprise the superposition of the shapes of all yaw claws 150a-g in the set 200 are possible.

Figure 10:
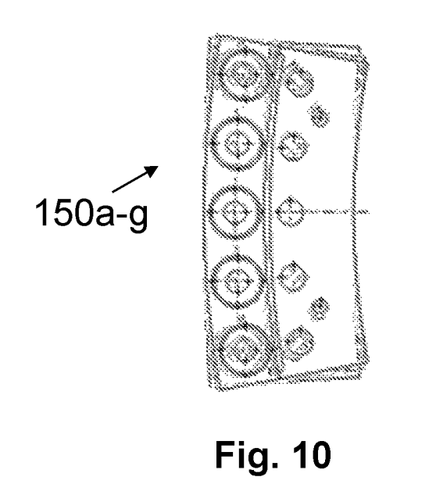
FIG. 10 shows a superposition of the shapes of the yaw claws of FIG. 8.

FIG. 10 shows a superposition of all the top views of the seven yaw claws 150a-g of FIG. 8. The superposition provides a clear indication of how similar two different yaw claws 150 can be, even when the diameter of the larger bearing is more than twice that of the smaller one.

It will be appreciated by those skilled in the art that the invention has been described by way of example only, and that a variety of alternative approaches may be adopted. For example, the outer bearing ring may be attached to the nacelle and the inner bearing ring to the tower. Instead of, or in addition to, the inner bearing ring, the outer bearing ring may be constructed from yaw claws according to the invention. These and other variations are possible without departing from the scope of the invention as defined by the appended claims

The invention claimed is:

1. A set of yaw claws comprising at least a first yaw claw and a second yaw claw, wherein the first yaw claw is formed from a mould and is for use in a bearing ring of a first yaw bearing, wherein the second yaw claw is formed from the same mould and is for use in a bearing ring of a second yaw bearing, and wherein a length of an outer arc of the first yaw claw is part of a circumference of the bearing ring of the first yaw bearing and a length of an outer arc of the second yaw claw is part of a circumference of the bearing ring of the second yaw bearing, the length of the outer arc of the first yaw claw being different than the length of the outer arc of the second yaw claw, the circumference of the bearing ring of the first yaw bearing being substantially different from the circumference of the bearing ring of the second yaw bearing; each yaw claw having:
   a periphery, formed by a first side end, a second side end, an inner arc and the respective outer arc, the inner arc and the respective outer arc being concentric with the respective bearing ring,
   at least two spring packs for pre-tensioning the yaw claw, respective spring pack centres of the at least two spring packs being arranged on a spring pack centreline that is concentric with the inner arc and the respective outer arc,
   wherein a length of the spring pack centreline, measured from the first side end to the second side end of the first yaw claw, is substantially equal to a length of the spring pack centreline of the second yaw claw.

2. The set of yaw claws of claim 1, wherein a length of the first side end and the second side end of the first yaw claw is substantially equal to the length of the first side end and the second side end of the second yaw claw.

3. The set of yaw claws of claim 2, wherein a depth profile of the first end and of the second end is substantially the same for the first and the second yaw claw.

4. The set of yaw claws of claim 1, wherein each yaw claw comprises at least one attachment feature for directly or indirectly fixing the yaw claw to a tower or a nacelle of a wind turbine, and wherein the first yaw claw and the second yaw claw have the same amount of said attachment features.

5. The set of yaw claws of claim 4, wherein the first and the second yaw claw comprise attachment features of the same type and/or dimension.

6. The set of yaw claws of claim 1, wherein the first yaw claw and the second yaw claw have the same amount of spring packs.

7. The set of yaw claws of claim 6, wherein a linear separation between any two adjacent spring pack centres of the first yaw claw is substantially the same as a linear separation between any two adjacent spring pack centres of the second yaw claw.

8. The set of yaw claws of claim 1, wherein the first and the second yaw claw comprise spring packs of the same type and/or dimension.

9. The set of yaw claws of claim 1, wherein each yaw claw comprises at least one bearing pad, and wherein the first yaw claw and the second yaw claw have the same amount of said bearing pads.

10. The set of yaw claws of claim 9, wherein the first and the second yaw claw comprise bearing pads of the same type and/or dimension.

11. The set of yaw claws of claim 1, wherein the outer arc of the first yaw claw and the outer arc of the second yaw claw have respective lengths between about 450 mm and 650 mm.

12. The set of yaw claws of claim 1, wherein a ratio of the length of the respective outer arc of each yaw claw and the circumference of the respective bearing ring is between 1:8 and 1:50.

13. A base claw, which shape, as seen from the top, is a superposition of the shapes of all yaw claws in a set of yaw claws as claimed in claim 1.

\* \* \* \* \*